United States Patent [19]

Schmid et al.

[11] 3,816,365

[45]*June 11, 1974

[54] ADDUCTS, CONTAINING EPOXIDE GROUPS, FROM POLYGLYCIDYL COMPOUNDS AND ACID POLYESTERS OF ALIPHATIC-CYCLOALIPHATIC DICARBOXYLIC ACIDS, PROCESS FOR THEIR MANUFACTURE AND USE

[75] Inventors: Rolf Schmid, Reinach/Basel-Land; Friedrich Lohse, Allschwil; Willy Fisch, Binningen; Hans Batzer, Arlesheim, all of Switzerland

[73] Assignee: Ciba-Geigy AG, Basel, Switzerland

[ * ] Notice: The portion of the term of this patent subsequent to Feb. 15, 1989, has been disclaimed.

[22] Filed: Nov. 9, 1972

[21] Appl. No.: 305,029

Related U.S. Application Data

[63] Continuation of Ser. No. 856,215, Sept. 8, 1969, abandoned.

[30] Foreign Application Priority Data

Sept. 12, 1968 Switzerland.................. 13677/68

[52] U.S. Cl........ 260/22 D, 260/18 EP, 260/22 EP, 260/348 A, 260/835
[51] Int. Cl. .... C08f 21/04, C08g 17/16, C08h 9/00
[58] Field of Search... 260/22 D, 348 A, 835, 18 EP

[56] References Cited
UNITED STATES PATENTS

| | | | |
|---|---|---|---|
| 2,712,535 | 7/1955 | Fisch | 260/835 |
| 3,219,603 | 11/1965 | Scheibli | 260/18 EP |
| 3,268,477 | 8/1966 | Mueller | 260/835 |
| 3,272,769 | 9/1966 | Hunyar | 260/835 |
| 3,278,636 | 10/1966 | Wynstra | 260/835 |
| 3,280,056 | 10/1966 | Masters | 260/18 EP |
| 3,374,193 | 3/1968 | Tsatsos et al. | 260/18 EP |
| 3,413,248 | 11/1968 | Kraft et al. | 260/835 |
| 3,523,143 | 8/1970 | Kwong | 260/835 |
| 3,642,674 | 2/1972 | Schmid et al. | 260/835 |
| 3,642,938 | 2/1972 | Schmid et al. | 260/835 |

*Primary Examiner*—Donald E. Czaja
*Assistant Examiner*—Ronald W. Griffin

[57] ABSTRACT

New adducts, containing epoxide groups, from (1) polyglycidyl compounds which contain at least one carbo-cyclic or heterocyclic ring and (2) acid polyesters which are obtained by esterification of aliphatic-cycloaliphatic higher dicarboxylic acids (manufactured by dimerization of unsaturated monomeric fatty acids with 14 to 24 carbon atoms in the molecule, preferably 16 to 18 carbon atoms, and optional subsequent hydrogenation of such a dimeric fatty acid) with $C_2$-$C_{18}$ glycols or diglycols (for example ethylene glycol, 1,2-propylene glycol, diethylene glycol, neopentylglycol or 1,6-hexanediol) by reaction with warming to form an adduct, with 0.03 to 0.4, preferably 0.1 to 0.3, equivalents of the acid polyester being employed per 1 equivalent of epoxide groups. The curing of such (so-called) "advanced" epoxide compounds with carbocyclic carboxylic acid anhydrides yields flexible impact-resistant shaped articles the mechanical properties of which are largely temperature-independent.

19 Claims, No Drawings

ADDUCTS, CONTAINING EPOXIDE GROUPS, FROM POLYGLYCIDYL COMPOUNDS AND ACID POLYESTERS OF ALIPHATIC-CYCLOALIPHATIC DICARBOXYLIC ACIDS, PROCESS FOR THEIR MANUFACTURE AND USE

This is a continuation of application Ser. No. 856,215, filed on Sept. 8, 1969, now abandoned.

It is known that polyepoxide compounds can be cured with carboxylic acid anhydrides to give moulded materials which are distinguished by high mechanical strength, heat resistance and dielectric strength. For many applications the relatively low flexibility of such moulded materials however proves to be insufficient. It is known that the flexibility can be increased by adding plasticisers, such as polyethylene glycol, polypropylene glycol or polyesters with terminal carboxyl groups and/or hydroxyl groups. Cured products which in part have significantly higher deflection and elongation at break are obtained in this way. The moulded materials however suffer from the disadvantage that the dielectric losses rise greatly for a slight rise in temperature; at temperatures below 0° C a severe embrittlement occurs and at room temperature the shaped articles rapidly take up major amounts of water in a moist atmosphere, which also worsens the dielectric properties.

It is furthermore known from Swiss Pat. No. 441,752 to manufacture moulded materials of high flexibility by reaction of acid polyesters from dimerized fatty acid and ε-caprolactone with epoxide resins. The shaped articles manufactured according to this invention however show only low mechanical strength at room temperature. The dielectric losses rapidly rise if the temperature is raised.

It has now been found that by (so-called) "advancement" of polyepoxide compounds and in particular preferably of certain cycloaliphatic glycidyl compounds with acid polyesters of special structure, derived from dimerized fatty acids, in certain stoichiometric quantity ratios, novel plasticised curable epoxide resins are obtained which on curing both with carboxylic acid anhydrides and also with polyamines or polyaminoamides can be converted into flexible shaped articles which are distinguished by high toughness, good dielectric properties even at elevated temperatures and low water absorption and which in these properties are distinctly superior to the shaped articles manufactured according to Swiss Pat. No. 441,752.

The acid polyesters derived from dimerised fatty acids which are used for the (so-called) "advancement" of polyepoxide compounds must fulfil very particular structural prerequisites.

Furthermore 0.03 to at most 0.4 carboxyl group equivalent of the acid polyester must be employed for the (so-called) "advancement" per 1 equivalent of epoxide groups of the polyepoxide compound. Best results are achieved on using 0.1 to at most 0.3 carboxyl group equivalent of the acid polyester. The subject of the present invention is thus new adducts, containing epoxide groups, from polyglycidyl compounds and acid polyesters, which are obtained by reacting acid polyesters of formula

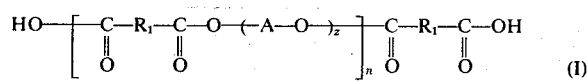 (I)

wherein $R_1$ denotes the hydrocarbon residue of an unsaturated or saturated aliphatic-cycloaliphatic higher dicarboxylic acid which has been manufactured by dimerization of unsaturated monomeric fatty acid with 14 to 24 carbon atoms in the molecule, preferably 16 to 18 carbon atoms, and optional subsequent hydrogenation of such a dimeric fatty acid, A denotes a straight-chain or branched-chain alkylene residue with 2 to 18 carbon atoms, z denotes an integer from 1 to 2, and n denotes an integer from 1 to 20, preferably from 2 to 6, with polyepoxide compounds, which contain at least one carbocyclic or heterocyclic ring as well as on an average more than one glycidyl group bonded to a hetero-atom per molecule, with warming, so as to form an adduct, with 0.03 to 0.4, preferably 0.1 to 0.3, equivalent of the acid polyester being employed per 1 equivalent of epoxide groups.

As polyglycidyl compounds of the above-mentioned nature, containing rings and on an average possessing more than one glycidyl group or β-methylglycidyl group bonded to a heteroatom (for example sulphur or nitrogen, preferably oxygen) there may especially be mentioned: diglycidyl ethers or polyglycidyl ethers or di-(β-methylglycidyl) ethers or poly-(β-methylglycidyl) ethers of polyhydric cycloaliphatic alcohols such as for example 1,1-bis(hydroxymethyl)cyclohexene-3, 1,1-bis(hydroxymethyl)cyclohexane, 1,4-bis(hydroxymethyl)cyclohexane, cis- and trans-quinitol, 2,2-bis(4'-hydroxycyclohexyl)-propane (= hydrogenated diomethane); di-glycidyl ethers or polyglycidyl ethers or di(β-methylglycidyl) ethers or poly(β-methylglycidyl) ethers of polyhydric phenols such as resorcinol, bis(p-hydroxyphenyl)methane, 2,2-bis(p-hydroxyphenyl)propane (= diomethane), 2,2-bis(4'-hydroxy-3',5'-dibromophenyl) propane, 1,1,2,2-tetrakis(p-hydroxyphenyl)ethane, or condensation products of phenols with formaldehyde obtained under acid conditions, such as phenol-novolacs and cresol-novolacs; diglycidyl esters and polyglycidyl esters or di(β-methylglycidyl) esters or poly(β-methylgylcidyl) esters of cycloaliphatic polybasic carboxylic acids, such as Δ⁴-tetrahydrophthalic acid, 4-methyl-Δ⁴-tetrahydrophthalic acid, hexahydrophthalic acid, 4-methyl-hexahydrophthalic acid, 3,6-endomethylene-Δ⁴-tetrahydrophthalic acid, 4-methyl-3,6-endomethylene-Δ⁴-tetrahydrophthalic acid; N-glycidyl derivatives of aromatic amines, N,N-diglycidyl-aniline, N,N-diglycidyltoluidine, N,N,N',N'-tetraglycidyl-bis-(p-aminophenyl)methane; N-glycidyl derivatives of N-heterocyclic nitrogen bases, for example triglycidyl isocyanurate, N,N-diglycidyl-ethyleneurea, N,N'-diglycidyl-5,5-dimethyl-hydantoin, N,N'-diglycidyl-5-isopropyl-hydantoin, N,N'-diglycidyl-5,5-dimethyl-6-isopropyl-5,6-dihydro-uracil.

Of course mixtures of the polygycidyl compounds recited above can also be used.

Polyglycidyl ethers or polyglycidyl esters derived from cycloaliphatic polyols or cycloaliphatic polycarboxylic acids are particularly suitable since the adducts manufactured with these are of relatively low viscosity, whilst adducts manufactured from aromatic polyglycidyl compounds are of higher viscosity and tend to demix in the cold. However, even cloudy mixtures yield perfect high quality shaped articles on curing.

The dicarboxylic acids of formula (I) used for the manufacture of the new adducts according to the invention are acid polyesters with two terminal carboxyl groups, such as are obtained by polycondensation of aliphatic-cycloaliphatic higher dicarboxylic acids of the nature defined above with aliphatic diols.

The aliphatic-cycloaliphatic higher dicarboxylic acids which are suitable for the manufacture of the acid polyester can be obtained by dimerization of monomeric fatty acids possessing sufficiently functional double bonds or of fatty acids derived from drying or semi-drying oils.

Possible monomeric fatty acids of this nature are those containing 14 to 24 carbon atoms, preferably 16 to 18 carbon atoms, in the molecule and possessing at least one reactive double bond in the molecule such as for example oleic acid, linoleic acid, linolenic acid, ricinenic acid and also fatty acids containing hydroxyl groups such as for example ricinoleic acid (= castor oil fatty acid).

As suitable semi-drying or drying oils from which such fatty acids are derived there may be mentioned: cottonseed oil, rapeseed oil, safflower oil, sesame oil, sunflower oil, soya oil, tung oil, linseed oil, oiticica oil, perilla oil and the like.

In the known dimerisation process for the manufacture of the aliphatic-cycloaliphatic dicarboxylic acids the fatty acids, which must contain at least one double bond in the molecule, predominantly react to form an acid mixture which mainly consists of dimeric constituents and to a small extent also of trimeric or higher molecular constituents. The monomeric insufficiently functional acids are removed from the reaction mixture by distillation.

The aliphatic-cycloaliphatic dicarboxylic acids obtained by polymerisation, which are unsaturated up to a certain degree, can be used directly or after a subsequently effected hydrogenation for the manufacture of the acid polyesters.

As diols of formula

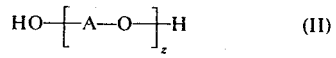

(A and z have the same significance as in formula (I)) for the manufacture of the acid polyesters there may especially be mentioned: ethylene glycol, diethylene glycol, 1,2-propanediol, (propylene glycol), 1,3-propanediol (trimethylene glycol), dipropylene glycol, 1,4-butanediol, 1,3-butanediol, 2,3-butanediol, 1,5-pentanediol, neopentyl glycol, 1,6-hexanediol, 1,7-heptanediol, 1,8-octanediol, 1,9-nonanediol, 1,10-decanediol, 1,11-undecanediol, 1,12-dodecanediol, 1,-6-di-hydroxy-2,2,4-trimethylhexane and 1,6-dihydroxy-2,2,4-trimethylhexane and 1,6-dihydroxy-2,4,4-trimethylhexane.

Of course mixtures of the diols (II) described above can also be used for the manufacture of the acid polyesters (I), and equally the acid component can consist of a mixture of two or more dimerized optionally hydrogenated fatty acids.

It is also possible when manufacturing the polyester (I) additionally to employ small proportions of trivalent or polyvalent components such as for example hexanetriol, trimerized fatty acid, or tricarboxylic or tetracarboxylic acid or its anhydride, such as trimellitic anhydride or pyromellitic anhydride. The adducts which result from the reaction of polyester mixture manufactured in this way, which in addition to polyesters of formula (I) further contain portions of more strongly chain-branched polyesters with more than two terminal carboxyl groups, with the cycloaliphatic polyepoxides, however yield moulded materials with similar physical properties after curing, so that in most cases no further advantages any longer arise therefrom. The adducts are as a rule manufactured by simple fusing together of the polyepoxide compound and the acid polyester of formula (I) in the prescribed stoichiometric quantity ratios. As a rule this process is carried out in the temperature range of 100° to 200° C, preferably of 130 to 180° C.

The new adducts according to the invention, containing epoxide groups, react with polycarboxylic acid anhydrides as curing agents to give novel moulded materials. Preferably, hardeners are used which on reaction with the polyepoxide used as the starting substance for the manufacture of the adducts (that is to say the unplasticised polyepoxide) alone yield cured moulded materials having a heat distortion point according to Martens DIN 53,458 of at least 90° C.

Such preferentially used curing agents are for example polycarboxylic acid anhydrides containing rings, above all cycloaliphatic polycarboxylic acid anhydrides, such as $\Delta^4$-tetrahydrophthalic anhydride, 4-methyl-$\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, 4-methyl-3,6-endomethylene-$\Delta^4$-tetrahydrophthalic anhydride, (= methylnadicanhydride) and the Diels-Alder adduct of 2 mols of maleic anhydride with 1 mol of 1,4-bis(cyclopentadienyl)-2-butene, or certain aromatic polycarboxylic acid anhydrides such as trimellitic anhydride or pyromellitic dianhydride.

It is however also possible to use other usual anhydride curing agents, for example phthalic anhydride, 3,4,5,6,7,7-hexachlor-3,6-endomethylene-$\Delta^4$-tetrahydrophthalic anhydride, succinic anhydride, adipic anhydride, azelaic anhydride, sebacic anhydride, maleic anhydride, dodecenylsuccinic anhydride and also mixtures of the above-mentioned anhydrides.

When curing the adducts containing epoxide groups according to the invention with carboxylic acid anhydrides, 0.5 to 1.2 gram equivalents of anhydride groups are appropriately used per 1 gram equivalent of epoxide groups.

A further preferred class of curing agents are cycloaliphatic polyamines since they are distinguished by low viscosity and high reactivity and can thus also be used for curing at room temperature or slightly elevated temperature. Suitable polyamines of this kind are: 1,2-diaminocyclohexane, 1,4-diaminocyclohexane, 1,3-diaminocyclohexane, 1,2-diamino-4-ethylcyclohexane, 1,4-diamino-3,6-diethylcyclohexane, 1,4-bis(aminomethyl)cyclohexane, dodecahydrobenzidine, N-cyclohexyl-propylenediamine-1,3, N-cyclohexylethylenediamine, N,N'-dicyclohexyl-propylenediamine-1,2, N,N'-dicyclohexyl-diethylenetriamine, 1,8-diamino-p-menthane and also especially 4,4'-diaminodicyclohexylmethane, 3,3'-dimethyl-4,4'-diaminodicyclohexylmethane, 2,2-bis(4'-aminocyclohexyl)propane, 1-amino-2-aminomethyl-cyclopentane and above all 3-(aminomethyl)-3,5,5-trimethyl-1-cyclohexylamine (= isophorone-diamine).

It is however also possible to use other known curing agents for epoxide resins, for example aliphatic amines such as monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3; aromatic or araliphatic amines such as benzidine, o-phenylenediamine, m-phenylenediamine, p-phenylenediamine, 4,4'-diaminodiphenylmethane, 4,4'-diaminodiphenylamine, 4,4'-diaminodiphenyldimethylmethane, 4,4'-diaminodiphenylsulphone or 4,4'-diaminodiphenyloxide, 4,4'-diaminodiphenylurea, 2,2'-diaminodiphenylmethane, N-phenylpropylenediamine, bis-($\beta$-aminoethyl)durene, 1,4-bis($\beta$-aminoethyl)benzene, o-xylylenediamine, p-xylylenediamine, m-xylylenediamine; Mannich bases such as 2,4,6-tris-(dimethylaminomethyl)phenol; $\beta$-aminoethyl-piperazine; adducts of acrylonitrile or monoepoxides, such as ethylene oxide or propylene oxide, to polyalkylenepolyamines such as diethylenetriamine or triethylenetetramine; adducts of polyamines such as diethylenetriamine and triethylenetetramine, in excess, and polyepoxides such as bisphenol-A-polyglycidyl ether; ketimines, for example from acetone or methyl ethyl ketone and bis(p-aminophenyl)methane; adducts of monophenols or polyphenols and polyamines; polyamides, especially those from aliphatic polyamines, such as diethylenetriamine or triethylenetetramine, and dimerized or trimerized unsaturated fatty acids, such as dimerized linseed oil fatty acid (VERSAMID); polymeric polysulphides (THIOKOL); dicyandiamide, aniline-formaldehyde resins; polyhydric phenols, for example resorcinol, 2,2-bis(4-hydroxyphenyl)propane or phenol-formaldehyde resins; boron trifluoride and its complexes with organic compounds, such as $BF_3$-ether complexes and $BF_3$-amine complexes, for example $BF_3$-monoethylamine complex; acetoacetanilide-$BF_2$ complex; phosphoric acid; triphenylphosphite.

Cure accelerators can furthermore be employed in the curing reaction, and in particular when using polyamides, polymeric polysulphides, dicyandiamide or polycarboxylic acid anhydrides as curing agents; such accelerators are for example tertiary amines, their salts or quaternary ammonium compounds, for example 2,4,6-tris(dimethylaminomethyl)phenol, benzyldimethylamine, 2-ethyl-4-methyl-imidazole, triamylammonium phenolate; tin$^{II}$ acylates, such as tin$^{II}$ octoate; or alkali metal alcoholates such as for example sodium hexanetriolate.

When curing the adducts according to the invention a proportion of an unplasticised polyepoxide compound can be added to the curable mixture; this polyepoxide compound can be identical with the polyepoxide used as the starting substance for the manufacture of the adduct. The amount of unplasticised polyepoxide added should as a rule be such that in the curable mixture the quotient M/N, wherein M denotes the carboxyl group content of the acid polyester employed for the adduct formation, in equivalents/kg and wherein N is the sum of (epoxide group content of the polyepoxide employed for the adduct formation, in equivalents/kg) + (epoxide group content of the unplasticised polyepoxide subsequently added to the adduct) becomes not greater than 0.4 and not less than 0.03.

The term "curing" as used here denotes the conversion of the above adducts into insoluble and infusible crosslinked products and in particular as a rule with simultaneous shaping to give shaped articles such as castings, pressings or laminates or to give two-dimensional structures such as lacquer films or adhesive bonds.

The subject of the present invention is therefore also curable mixtures which are suitable for the manufacture of shaped articles including two-dimensional structures and which contain the adducts containing epoxide groups, according to the invention, optionally together with an unplasticised polyepoxide, as well as a curing agent for epoxide resins such as a polyamine or a polycarboxylic acid anhydride.

The adducts according to the invention or their mixtures with other polyepoxide compounds and/or curing agents can further be mixed, in any stage before curing, with usual modifiers such as extenders, fillers and reinforcing agents, pigments, dyestuffs, solvents, flow control agents, agents for conferring thixotropy, flameproofing substances or mould release agents.

Suitable organic solvents for the modification of the curable mixtures are for example toluene, xylene, butyl acetate, acetone, methyl ethyl ketone, and ethylene glycol monobutyl ether.

As extenders, reinforcing agents, fillers and pigments which can be employed in the curable mixtures according to the invention there may for example be mentioned: glass fibres, boron fibres, carbon fibres, cellulose, polyethylene powder, polypropylene powder, mica, asbestos, quartz powder, slate powder, burnt kaolin, aluminium oxide trihydrate, chalk powder, gypsum, antimony trioxide, bentones, silica aerogel (AEROSIL), lithopones, barytes, titanium dioxide, carbon black, graphite, iron oxide or metal powder such as aluminium powder or iron powder.

The curable mixtures, in the unfilled or filled state, can especially serve as laminating resins, dipping resins, impregnating resins, casting resins or potting and insulating compositions for the electrical industry. They can furthermore be successfully used for all other industrial fields where usual epoxide resins are employed, for example as binders, adhesives, paints, lacquers, compression moulding compositions and sintering powders.

In the examples which follow the percentages denote percentages by weight. The following acid polyesters were used for the manufacture of adducts containing epoxide groups described in the examples:

a) Manufacture of dimerized fatty acids Manufacture of dimerized castor oil fatty acid 1850.7 g (6.20 mols) of castor oil fatty acid are heated in a sulphonating flask equipped with a stirrer, thermometer and descending condenser, for 20 hours to 175° – 180° C together with 9 g of potassium bisulphate, and the water split off is continuously distilled off. The reaction mixture is then distilled, whereby 1411 g of a light yellow oily product are obtained at 184° C/0.15 mm Hg to 193° C/0.25 mm Hg; on the basis of mass spectra this product consists of a mixture of carboxylic acids of molecular weight 280, 282 and 284. From hydrogenation experiments one is forced to the conclusion that the product contains substantial proportions of ricinoleic acid. 9.074 mg of substance consume 1.67 ml of hydrogen (reduced volume).

The 1411 g of product distilled above, containing diolefinic fatty acids, were allowed to react for 15 hours at 260° C under nitrogen in an autoclave and thereafter constituents distillable up to 190° C/0.07 mm Hg were removed. Hereupon 855.9 g of a dimerized castor coil fatty acid which was reddish brown in colour and had an acid equivalent weight of 281 were obtained.

MANUFACTURE OF HYDROGENATED DIMERISED CASTOR OIL FATTY ACID 169.2 g of the dimerized castor oil fatty acid obtained above were dissolved in 300 ml of n-hexane and hydrogenated with 10 g of 10 percent strength palladium on charcoal at 60 atmospheres and 60° C until no further hydrogen absorption could be detected. The catalyst was then filtered off and the filtratre concentrated to constant weight, whereupon 156.0 g of hydrogenated dimerised fatty acid resulted.

b) MANUFACTURE OF POLYESTERS Manufacture of Polyester A from dimerized castor oil fatty acid and diethylene glycol 421.0 g (0.752 mol) of the dimerized castor oil fatty acid manufactured above were mixed with 66.5 g (0.628 mol) of diethylene glycol (corresponding to a ratio of 6 equivalents of dimerized fatty acid per 5 equivalents of diethylene glycol) in a sulphonating flask equipped with a stirrer, thermometer and descending condenser, and heated for 54 hours to 165 to 175° C under nitrogen. Hereupon a viscous brown-coloured polyester with an acid equivalent weight of 1849 was obtained.

MANUFACTURE OF POLYESTER B FROM DIMERIZED HYDROGENATED CASTOR OIL FATTY ACID AND ETHYLENE GLYCOL 156.0 g (0.277 mol) of hydrogenated dimerised castor oil fatty acid (acid equivalent weight 281) and 11.5 g (0.185 mol) of ethylene glycol (corresponding to a ratio of 3 equivalents of dimerized castor oil fatty acid per 2 equivalents of ethylene glycol) are mixed in a sulphonating flask equipped with a stirrer, thermometer and descending condenser, and heated for 24 hours to 156°– 160° C. The water split off was continuously distilled off. A viscous polyester of a dark brown colour, having an acid equivalent weight of 949, was obtained.

MANUFACTURE OF POLYESTER C 3008 g of a dibasic acid manufactured by dimerization of oleic acid, having an average of 36 carbon atoms and an acid equivalent weight of 286 (obtainable from Emery Industries under the registered trade name EMPOL 1014) were warmed to 147° C under a nitrogen atmosphere with 244 g of ethylene glycol (corresponding to a ratio of 3 equivalents of ethylene glycol per 4 equivalents of dimerized fatty acid). The mixture was further warmed to 176° C over the course of 6 hours while stirring and the water produced by the polycondensation was distilled off. The reaction product was cooled to 152° C and subjected to a vacuum down to 12 mm Hg. The mixture was warmed to 165° C over the course of 1½ hours in vacuo, while stirring. The reaction product was a light yellow viscous liquid with an acid equivalent weight of 986 (theory 1188).

MANUFACTURE OF POLYESTER D 3430 g of dimerized oleic acid (EMPOL 1014) which was used in the manufacture of polyester C, were warmed to 136° C under a nitrogen atmosphere with 477 g of diethylene glycol (corresponding to a ratio of 4 equivalents of dimerized fatty acid per 3 equivalents of diethylene glycol). The mixture was further warmed to 195° C over the course of 12 hours while stirring, and the water which was formed was continuously distilled off. Thereafter the reaction product was kept for 2 hours at 190° C under a vacuum of 13 mm Hg. The reaction product was a light yellow viscous liquid with an acid equivalent weight of 1172 (theory 1502).

MANUFACTURE OF POLYESTER E 2860 g of dimerized oleic acid, which was used for the manufacture of polyester C, were warmed to 144° C under a nitrogen atmosphere with 286 g of 1,2-propylene glycol (corresponding to a ratio of 4 equivalents of dimerized oleic acid per 3 equivalents of propylene glycol). The mixture was further warmed to 191° C over the course of 6½ hours while stirring and the water formed was continuously distilled off. Thereafter the reaction product was kept under a vacuum of 12 mm Hg at this temperature for 1 hour. The reaction product was a light yellow viscous liquid with an acid equivalent weight of 988 (theory = 1204).

MANUFACTURE OF POLYESTER F 1145 g of dimerized oleic acid, which was used for the manufacture of polyester C, were warmed to 138° C under a nitrogen atmosphere with 156 g of neopentyl glycol (corresponding to a ratio of 4 equivalents of dimerized oleic acid per 3 equivalents of neopentyl glycol). The mixture was further warmed to 188° C over the course of 6 hours while stirring and the water formed was continuously distilled off. The reaction product was now cooled to 132° C and warmed to 178° C over the course of 1¼ hours under 12 mm Hg. The reaction product was a light yellow viscous liquid with an acid equivalent weight of 1210 (theory = 1499).

MANUFACTURE OF POLYESTER G 1132 g of dimerized oleic acid, which was used for the manufacture of polyester C, were warmed to 148° C under a nitrogen atmosphere with 177 g of 1,6-hexanediol (corresponding to a ratio of 3 equivalents of 1,6-hexanediol per 4 equivalents of the dimerized oleic acid). The mixture was further warmed to 208° C over the course of 4½ hours while stirring and the water produced by the polycondensation was continuously distilled off. The last remnants of water were removed by a vacuum treatment at 20 to 10 mm Hg and 205° C over the course of 1 hour. The reaction product was a light yellow viscous liquid with an acid equivalent weight of 1288 (theory 1255).

MANUFACTURE OF POLYESTER H 800 g of dimerized oleic acid, which was used in the manufacture of polyester C, were warmed to 140° C under a nitrogen atmosphere with 82.6 g of hexanediol (corresponding to a ratio of 1 equivalent of glycol per 2 equivalents of the dimerized oleic acid). The mixture was further warmed to 201° C over the course of 5 hours while stirring and the water formed was continuously distilled off. Thereafter the mixture was subjected to a vacuum (12 mm Hg) at this temperature for 100 minutes, while stirring. The reaction product was a light yellow viscous liquid with an acid equivalent weight of 605 (theory = 739).

MANUFACTURE OF POLYESTER I 2583 g of the dimerized oleic acid used for the manufacture of polyester C were mixed with 258 g of ethylene glycol (corresponding to a ratio of 9 equivalents of the dimerised oleic acid per 8 equivalents of glycol, with 4 percent excess of glycol) and heated for 8 hours to 160° C and then for 52 hours to 170° C, under a nitrogen atmosphere. In the course of this 145 ml of water were split off corresponding to the theoretical value. A viscous brown-coloured polyester with an acid equivalent weight of 2572 (theory 2687) resulted.

MANUFACTURE AND PROCESSING OF THE ADDUCTS

EXAMPLE 1

300 g of polyester A were stirred for 3 hours in a nitrogen atmosphere at 145° C with 150 g of hexahydrophthalic acid diglycidyl ester having an epoxide content of 6.3 epoxide equivalents per kg and a viscosity at 25° C of 320–380 cP (= epoxide resin I). The resulting adduct had an epoxide content of 1.63 epoxide equivalents per kg.

CURE:

613 g of the adduct were warmed to 100° C with 178 g of 3,6-endomethylene-$\Delta^4$-tetrahydrophthalic anhydride (= methylnadicanhydride) [corresponding to 1.0 equivalent of epoxide per 1.0 mol of anhydride] and after adding 3 g of a 6 percent strength solution of the sodium alcoholate of 3-hydroxymethyl-2,4-dihydroxypentane (subsequently described as "sodium hexylate" for brevity) in 3-hydroxymethyl-2,4-dihydroxypentane (subsequently referred to as "hexanetriol" for brevity) the composition was mixed, subjected to a short vacuum treatment to remove the air bubbles and poured into aluminium moulds treated with a silcone release agent and prewarmed to 100° C, with sheets of 135 × 135 × 4 mm being manufactured for determining the flexural strength, deflection, impact strength (examples 3 and 4) and water absorption, and identical sheets but with a thickness of 3 mm being manufactured for measuring the loss factor. The test specimens for the flexural test and impact test were machined from the sheets, whilst for the tensile test the appropriate test specimens according to DIN 16,946 or DIN 53,455, sample shape 2 (4 mm) or VSM 77,101 FIG. 1 (4 mm thick test rod) were manufactured directly. After a heat treatment of 16 hours at 140°C the following properties were measured on the test specimens:

| | |
|---|---|
| tensile strength (VSM 77,101) | =0.57 kg/cm |
| elongation at break (VSM 77,101) | =70 percent |
| water absorption after 24 hours at 20° C | =0.15 percent |
| dielectric loss factor tg δ (50 Hz) at 20° C | =0.03 |

EXAMPLE 2

120 g of polyester B were stirred for 3 hours in a nitrogen atmosphere at 140° C with 120 g of $\Delta^4$-tetrahydrophthalic acid diglycidyl ester having an epoxide content of 6.45 epoxide equivalents/kg and a viscosity at 25° C of 450 – 550 cP (= epoxide resin II). The resulting adduct had an epoxide content of 2.26 epoxide equivalents/kg.

CURE:

442 g of the adduct obtained were warmed to 90° C with 154 g of hexahydrophthalic anhydride (corresponding to 1.0 equivalent of epoxide per 1.0 mol of anhydride) and after adding 3 g of a 6 percent strength solution of "sodium hexylate" in "hexanetriol" the mixture was deaerated and poured into the prewarmed moulds according to Example 1. After a heat treatment of 16 hours at 140° C shaped articles with the following properties were measured:

| | |
|---|---|
| tensile strength (VSM 77,101) | =1.2 kg/mm² |
| elongation at break (VSM 77,101) | =66 percent |
| water absorption after 24 hours at 20° C | =0.13 percent |
| dielectric loss factor tg δ (50 Hz) at 20° C | =0.04 |
| at 80° C | =0.04 |

EXAMPLE 3

300 g of polyester C were stirred for 3 hours at 140° C under a nitrogen atmosphere with 300 g of epoxide resin II ($\Delta^4$-tetrahydrophthalic acid diglycidyl ester). The viscous light yellow clear reaction product had an epoxide content of 2.48 epoxide equivalents/kg.

CURE:

a) 403 g (= 1.0 equivalent) of the resulting adduct were warmed to 90° C with 154 g (= 1.0 mol) of hexahydrophthalic anhydride and 6 g of a 6 percent strength solution of "sodium hexylate" in "hexanetriol" and poured into the prewarmed moulds according to Example 1 after a brief deaeration. After a heat treatment of 16 hours at 90° C the following properties were measured on the shaped articles:

| | |
|---|---|
| limiting flexural stress (VSM 77,103) | =1.8 kg/mm² |
| deflection (VSM 77,103) | =>20 mm |
| impact strength (VSM 77,105) | =>25 cmkg/cm² |
| tensile strength (VSM 77,101) | =200 kp/cm² |
| elongation at break (VSM 77,101) | =52 percent |
| water absorption after 24 hours at 20° C | =0.13% |
| dielectric loss factor tg δ (50 Hz) at 20°C | =0.026 |
| at 60°C | =0.060 |
| at 100°C | =0.019 |

These shaped articles show exceptionally good chemical resistance.

After 30 days storage in the following media, the following weight changes were measured:

| | Weight change after storage at | |
|---|---|---|
| | 20°C | 66°C |
| water | 1.1% | 2.0% |
| mineral oil | 0.6% | 2.5% |
| 10 % strength H₂SO₄ | 0.9% | 0.09% |
| 25 % strength NH₄NO₃ | 0.9% | 1.1% | b) On using 0.9 mols of hexahydrophthalic anhydride and otherwise the same composition and processing as in Example 3 a), shaped articles with the following properties were obtained:

| | |
|---|---|
| limiting flexural stress (VSM 77,103) | =2.5 kg/mm² |
| deflection (VSM 77,103) | =>20 mm |
| impact strength (VSM 77,105) | =>25 cmkg/cm² |
| tensile strength (VSM 77,101) | =2.5 kg/mm² |
| elongation at break (VSM 77,101) | =35% |
| water absorption after 24 hours at 20°C | =0.15% |
| dielectric loss factor tg δ (50 Hz) at 20°C | =0.019 |
| at 60°C | =0.037 |
| at 100°C | =0.056 | c) 403 g of the adduct used in Example 3 a) were warmed to 90° C, well mixed with 42.3 g 3-(aminomethyl)-3,5,5-trimethylcyclohexylamine (= isophorone-diamine) and after a short vacuum treatment poured into the moulds according to Example 1. After a heat treatment of 16 hours at 90° C shaped articles with the following properties were obtained:

| | |
|---|---|
| limiting flexural stress (VSM 77,103) | =0.86 kg/mm² |
| impact strength (VSM 77,105) | =25 cmkg/cm² |
| tensile strength (VSM 77,101) | =1.40 kg/mm² |
| elongation at break (VSM 77,101) | =75% |
| water absorption after 24 hours at 20° C | =0.4% | d) 400 g of the adduct according to Example 3 a) were warmed to 90° C, well mixed with 71.6 g of bis(4-hydroxy-3-methylcyclohexyl)methane and after a short vacuum treatment poured into the moulds according to Example 1. After a heat treatment of 16 hours at 90° C shaped articles with the following properties were obtained:

| | |
|---|---|
| tensile strength (VSM 77,101) | =1.35 kg/mm² |
| elongation at break (VSM 77,101) | =80% |

EXAMPLE 4

400 g of polyester C were stirred for 3 hours in a nitrogen atmosphere at 140° C with 400 g of a diomethane-diglycidyl ether manufactured by condensation of epichlorhydrin with 2,2-bis-(p-hydroxyphenyl)-propane (= diomethane) in the presence of alkali, which was liquid at room temperature and had an epoxide content of 5.35 epoxide equivalents/kg and a viscosity at 25° C of about 10,000 cP (= epoxide resin III). The resulting adduct showed a milky cloudiness at room temperature and had an epoxide content of 2.19 epoxide equivalents/kg.

CURE:

456 g of the resulting adduct (= 1.0 equivalent) were well mixed with 139 g of hexahydrophthalic anhydride (= 0.9 mol) and 9.1 g of a 6 percent strength solution of "sodium hexylate" in "hexanetriol" at 70° C and after degassing the mixture was poured into the prewarmed moulds according to Example 1. After a heat treatment of 16 hours at 90° C clear transparent mouldings with the following properties were obtained:

| | |
|---|---|
| limiting flexural stress (VSM 77,103) | =1.5 kg/mm² |
| deflection (VSM 77,103) | =>20 mm |
| impact strength (VSM 77,105) | =>25 cmkg/cm² |
| tensile strength (VSM 77,101) | =2.1 kg/mm² |
| elongation at break (VSM 77,101) | =30% |
| water absorption after 24 hours at 20°C | =0.09% |
| dielectric loss factor tg δ (50 Hz) | |
| at 20°C | =0.010 |
| at 60°C | =0.039 |
| at 100°C | =0.021 |

EXAMPLE 5

600 g of polyester D were stirred for 3 hours in a nitrogen atmosphere at 145° C with 600 g of epoxide resin I (hexahydrophthalic acid diglycidyl ester). The resulting adduct was a light yellow viscous liquid with an epoxide content of 2.38 epoxide equivalents/kg and an acid equivalent weight of 50,000.

CURE:

a) 420 g of the resulting adduct (= 1.0 equivalent) were warmed to 80° C with 139 mols of hexahydrophthalic anhydride (= 0.9 mol) and 12.6 g of a 6 percent strength solution of "sodium hexylate" in "hexanetriol" and poured into the moulds according to Example 1. After a heat treatment of 16 hours at 140° C shaped articles with the following properties were obtained:

| | |
|---|---|
| tensile strength (VSM 77,101) | =1.3 kg/mm² |
| elongation at break (VSM 77,101) | =70% |
| dielectric loss factor tg δ (50 Hz) | |
| at 20°C | =0.018 |
| at 40°C | =0.018 |
| at 60°C | =0.05 | b 420 g of the adduct used in Example 5 a) were well mixed with 84 g of N,N'-dicyclohexyl-hexamethylenediamine and 21.3 g of isophorone-diamine at 60° C and after degassing the mixture was poured into the moulds according to Example 1. After a heat treatment of 16 hours at 90° C elastic shaped articles having a high elongation at break were obtained:

| | |
|---|---|
| tensile strength (VSM 77,101) | =0.3 kg/mm² |
| elongation at break (VSM 77,101) | =310% | c 420 g of the adduct used in Example 5a) were mixed at room temperature with 24.3 g of triethylenetetramine and spread on a metal sheet. The mixture gelled at room temperature and formed a very tough film.

EXAMPLE 6

300 g of polyester D were stirred for 3 hours under a nitrogen atmosphere with 300 g of 1(N), 3 (N')-diglycidyl-5,5-dimethylhydantoin having an epoxide content of 7.6 epoxide equivalents/kg (= epoxide resin IV). The reaction product was a viscous liquid with a slight milky cloudiness and an epoxide content of 2.7 epoxide equivalents/kg.

CURE:

a 370 g of the resulting adduct (= 1.0 equivalent) were warmed to 100° C with 154 g of hexahydrophthalic anhydride and 6 g of a 6 percent solution of "sodium hexylate" in "hexanetriol," well mixed, and the mixture briefly deaerated and poured into the prewarmed moulds according to Example 1. After a heat treatment of 16 hours at 140° C the following properties were measured on the shaped articles:

| | |
|---|---|
| limiting flexural stress (VSM 77,103) | =2.8 kg/mm² |
| deflection (VSM 77,103) | =>20 mm |
| impact strength (VSM 77,105) | =>25 cmkg/cm² |
| tensile strength (VSM 77,101) | =3.2 kg/mm² |
| elongation at break (VSM 77,101) | =30% |
| water absorption after 24 hours at 20°C | =0.24% |
| dielectric loss factor tg δ (50 Hz) | |
| at 20°C | =0.013 |
| at 60°C | =0.022 |
| at 90° C | =0.045 | b On using 1.0 equivalent of methylnadicanhydride instead of the equivalent quantity of hexahydrophthalic anhydride and otherwise the same composition and processing as under Example 6 a), mouldings with the following properties were obtained:

| | |
|---|---|
| limiting flexural stress (VSM 77,103) | =2.8 kg/mm² |
| deflection (VSM 77,103) | =20 mm |
| impact strength (VSM 77,105) | =25 cmkg/cm² |
| tensile strength (VSM 77,101) | =3.3 kg/mm² |
| elongation at break (VSM 77,101) | =28% |
| water absorption after 24 hours at 20°C | =0.23% |
| dielectric loss factor tg δ (50 Hz) | |
| at 20°C | =0.013 |
| at 60°C | =0.022 |
| at 90°C | =0.045 |

EXAMPLE 7

200 g of polyester C were warmed to 140° C with 200 g of 1,1-bis(glycidyloxymethyl)cyclohexene-3 having an epoxide content of 6.25 epoxide equivalents/kg (= epoxide resin V) and stirred for 3 hours under a nitrogen atmosphere. The resulting reaction product was a light yellow liquid of very low viscosity having an epoxide content of 2.84 epoxide equivalents/kg.

CURE:

352 g of the resulting adduct (= 1.0 equivalent) were well mixed at 20° C with 59.6 g of bis(4-amino-3-methylcyclohexyl)-methane (= 1 equivalent). The mixture, which was of low viscosity, was briefly deaerated and poured into the moulds according to Example 1. After a heat treatment of 20 hours at 90° C shaped articles with the following properties were obtained:

| | |
|---|---|
| tensile strength (VSM 77,101) | =0.17 kg/mm$^2$ |
| elongation at break (VSM 77,101) | =122% |

EXAMPLE 8

300 g of polyester E were warmed for 3 hours to 140° C with 300 g of the epoxide resin II used in Example 2 ($\Delta^4$-tetrahydrophthalic acid diglycidyl ester) and 3 g of a 15 percent strength solution of sodium methylate in methanol. The reaction product was a very viscous liquid with a slight milky cloudiness, having an epoxide content of 2.46 epoxide equivalents/kg and an acid equivalent weight of over 50,000.

CURE:

a 406 g of the resulting adduct were warmed to 100° C with 154 g of hexahydrophthalic anhydride and 6 g of a 6 percent strength solution of "sodium hexylate" in "hexanetriol", well mixed, and the mixture briefly deaerated and poured into the prewarmed moulds according to Example 1. After a heat treatment of 16 hours at 140° C mouldings with the following properties were obtained:

| | |
|---|---|
| flexural strength (VSM 77,103) | =1.4 kg/mm$^2$ |
| deflection (VSM 77,103) | =>20 mm |
| tensile strength (VSM 77,101) | =2.0 kg/mm$^2$ |
| elongation at break (VSM 77,101) | =47% |
| water absorption after 24 hours at 20°C | =0.15% |
| dielectric loss factor tg δ (50 Hz) | |
| at 20°C | =0.025 |
| at 60°C | =0.058 |
| at 100°C | =0.017 | b 406 g of the adduct used in Example 8a) (= 1.0 equivalent) were warmed to 90° C with 23.4 g of N,N'-dicyclohexyl-hexamethylenediamine (= 0.6 equivalents) and 21.3 g of isophoronediamine (= 0.5 equivalents), well mixed, and the mixture briefly deaerated and poured into the moulds prewarmed to 90° C. After a heat treatment of 16 hours at 90° C shaped articles with the following properties were obtained:

| | |
|---|---|
| tensile strength (VSM 77,101) | =0.35 kg/mm$^2$ |
| elongation at break (VSM 77,101) | =360% |
| water absorption after 24 hours at 20°C | =0.47 % | c In a further batch, the components employed in Example 8b) were mixed at room temperature and cast as a 1 mm thick layer on a metal sheet. After 24 hours storage at room temperature a dry tough film was produced. Surprisingly, good curing at room temperature took place in the case of the adducts according to the invention with cycloaliphatic amines.

EXAMPLE 9

300 g of polyester F were stirred for 3 hours in a nitrogen atmosphere with 300 g of the epoxide resin I used in Example 1 (hexahydrophthalic acid diglycidyl ester). The reaction product was a viscous liquid with an epoxide content of 2.55 epoxide equivalents/kg.

CURE:

392 g of the adduct obtained (= 1.0 equivalent) were warmed to 100° C with 154 g of hexahydrophthalic anhydride (=1.0 equivalent) and 3 g of a 6 percent strength solution of "sodium hexylate" in "hexanetriol," well mixed, and the mixture briefly deaerated and poured into the prewarmed moulds according to Example 1. After a heat treatment of 16 hours at 140° C shaped articles with the following properties were obtained:

| | |
|---|---|
| tensile strength (VSM 77,101) | =2.1 kg/mm$^2$ |
| elongation at break (VSM 77,101) | =24% |
| water absorption after 24 hours at 20°C | =0.2% |

EXAMPLE 10

500 g of polyester G were stirred for 3 hours under a nitrogen atmosphere with 500 g of the epoxide resin I used in Example 1. The resulting adduct was a light yellow viscous liquid with an epoxide content of 2.5 epoxide equivalents/kg.

CURE:

402 g (= 1.0 equivalent) of the resulting adduct were warmed to 80° C with 154 g (= 1.0 equivalent) of hexahydrophthalic anhydride and 3 g of a 6 percent strength solution of "sodium hexylate" in "hexanetriol", well mixed, and the mixture deaerated in vacuo and poured into the moulds according to Example 1. After a heat treatment of 16 hours at 140° C shaped articles with the following properties were obtained:

| | |
|---|---|
| tensile strength (VSM) | =2.10 kg/mm$^2$ |
| elongation at break (VSM) | =43% |
| water absorption after 24 hours at 20°C | =0.12% |

EXAMPLE 11

500 g of polyester G were stirred for 3 hours in a nitrogen atmosphere at 140° C with 500 g of the epoxide resin V used in Example 7 (1,1-bis(glycidyloxymethyl)-cyclohexene-3) having an epoxide content of 6.25 epoxide equivalents per kg. The reaction product was a light yellow liquid of relatively low viscosity, having an epoxide content of 2.89 epoxide equivalents kg.

CURE:

346 g (= 1.0 equivalent) of the resulting adduct were well mixed at 40° C with 154 g of hexahydrophthalic anhydride (= 1.0 equivalent) and 3 g of a 6 percent strength solution of "sodium hexylate" in "hexanetriol," briefly deaerated in vacuo and poured into the prewarmed moulds according to Example 1. After a heat treatment of 16 hours at 140° C shaped articles with the following properties were obtained:

| | |
|---|---|
| tensile strength (VSM) | =0.71 kg/mm$^2$ |
| elongation at break (VSM) | =104% |
| water absorption after 24 hours | |

EXAMPLE 12

96.3 g of Δ⁴-tetrahydrophthalic acid di-(β-methylglycidyl)-ester with an epoxide content of 6.25 epoxide equivalents per kg (= epoxide resin VI) were warmed for 3 hours under a nitrogen atmosphere at 140° C with 121 g of polyester H (corresponding to 3 mols of diepoxide per 1 mol of acid polyester). A reaction product with an epoxide content of 1.66 epoxide equivalents per kg was obtained.

CURE:

120.4 g of the resulting adduct were warmed to 110° C with 30.8 g of hexahydrophthalic anhydride (corresponding to 1.0 equivalent of epoxide group per 1.0 equivalent of anhydride group) and after addition of 0.12 g of dimethylbenzylamine the mixture was poured into the prewarmed moulds according to Example 1. Shaped articles with the following properties were obtained:

| | |
|---|---|
| tensile strength (VSM 77,101) | =0.34 kg/mm² |
| elongation at break (VSM 77,101) | =100% |
| water absorption after 24 hours at 20°C | =0.19% |
| dielectric loss factor tg δ (50 Hz) | |
| at 20°C | =0.062 |
| at 50°C | =0.050 |
| at 80°C | =0.020 |

EXAMPLE 13

157 g of polyester I were stirred for 3 hours at 140° C with 156.5 g of epoxide resin VI (corresponding to 1 mol of acid polyester per 16 mols of diepoxide). A reaction product with an epoxide content of 2.68 epoxide equivalents per kg was obtained.

CURE:

373 g of the resulting adduct were warmed to 100° C with 266 g of dodecenylsuccinic anhydride, well mixed with 3.7 g of a 6 percent strength solution of "sodium hexylate" in "hexanetriol," and the mixture was briefly subjected to a vacuum and poured into the prewarmed moulds according to Example 1. After a heat treatment of 16 hours at 140° C elastic shaped articles with the following properties were obtained:

| | |
|---|---|
| tensile strength (VSM 77,101) | =0.15 kg/mm² |
| elongation at break (VSM 77,101) | =77% |
| water absorption after 24 hours at 20°C | =0.13% |
| dielectric loss factor tg δ (50 Hz) | |
| at 20°C | =0.042 |
| at 60°C | =0.028 |
| at 90°C | =0.008 |

We claim:

1. An adduct, containing epoxide groups, from (1) a polyepoxide which possesses at least one five membered or six membered carbocyclic or heterocyclic ring as well as on an average more than one glycidyl group bonded to a hetero-atom per molecule, and (2) 0.03 to 0.4 carboxyl group equivalents per 1 epoxide group equivalent of the polyepoxide (1), of an acid polyester of formula

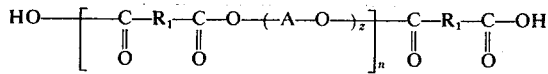

wherein $R_1$ denotes the hydrocarbon residue of a member selected from the group consisting of an unsaturated aliphatic-cycloaliphatic higher dicarboxylic acid which has been manufactured by dimerization of unsaturated monomeric fatty acid having 14 to 24 carbon atoms in the molecule, and a saturated aliphatic-cycloaliphatic higher dicarboxylic acid which has been manufactured by dimerization of unsaturated monomeric fatty acid having 14 to 24 carbon atom in the molecule and subsequent hydrogenation of such a dimeric fatty acid, A denotes a straight-chain or branched-chain alkylene residue with 2 to 18 carbon atoms, z denotes an integer of at least 1 and at most 2, and n denotes an integer from 1 to 20.

2. An adduct, containing epoxide groups, from (1) a polyepoxide which possesses at least one five membered or six membered carbocyclic or heterocyclic ring as well as on an average more than one glycidyl group bonded to a hetero-atom per molecule, and (2) 0.1 to 0.3 carboxyl group equivalent per 1 epoxide group equivalent of the polyepoxide compound (1), of an acid polyester of formula

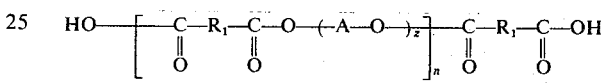

wherein $R_1$ denotes the hydrocarbon residue of a member selected from the group consisting of an unsaturated aliphatic-cycloaliphatic higher dicarboxylic acid which has been manufactured by dimerization of unsaturated monomeric fatty acid having 14 to 24 carbon atoms in the molecule, and a saturated aliphatic-cycloaliphatic higher dicarboxylic acid which has been manufactured by dimerization of unsaturated monomeric fatty acid having 14 to 24 carbon atoms in the molecule and subsequent hydrogenation of such a dimeric fatty acid, A denotes a straight-chain or branched-chain alkylene residue with 2 to 18 carbon atoms, z denotes an integer of at least 1 and of at most 2, and n denotes an integer from 1 to 20.

3. An adduct, containing epoxide groups, from (1) a polyepoxide which possesses at least one five membered or six membered carbocyclic or heterocyclic ring as well as on an average more than one glycidyl group bonded to a hetero-atom per molecule, and (2) 0.03 to 0.4 carboxyl group equivalent per 1 epoxide group equivalent of the polyepoxide compound (1), of an acid polyester of formula

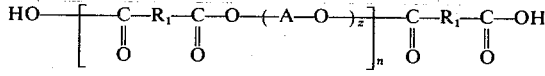

wherein $R_1$ denotes the hydrocarbon residue of a member selected from the group consisting of an unsaturated aliphatic-cycloaliphatic higher dicarboxylic acid which has been manufactured by dimerization of unsaturated monomeric fatty acid having 16 to 18 carbon atoms in the molecule, and a saturated aliphatic-cycloaliphatic higher dicarboxylic acid which has been manufactured by dimerization of unsaturated monomeric fatty acid having 16 to 18 carbon atoms in the molecule and subsequent hydrogenation of such a dimeric fatty acid, A denotes a straight-chain or branched-chain alkylene residue with 2 to 18 carbon atoms, z denotes an integer of at least 1 and at most 2, and n denotes an integer from 1 to 20.

4. An adduct, containing epoxide groups, from (1) a polyepoxide which possesses at least one five membered or six membered carbocyclic or heterocyclic ring as well as on an average more than one glycidyl group bonded to a hetero-atom per molecule, and (2) 0.03 to 0.4 carboxyl group equivalents per 1 epoxide group equivalent of the polyepoxide (1), of an acid polyester of formula

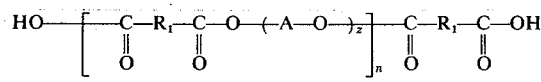

wherein $R_1$ denotes the hydrocarbon residue of a member selected from the group consisting of an unsaturated aliphatic-cycloaliphatic higher dicarboxylic acid which has been manufactured by dimerization of unsaturated monomeric, fatty acid having 14 to 24 carbon atoms in the molecule and a saturated aliphatic-cycloaliphatic higher dicarboxylic acid which has been manufactured by dimerization of unsaturated monomeric fatty acid having 14 to 24 carbon atoms in the molecule and subsequent hydrogenation of such a dimeric fatty acid, A denotes a straight-chain or branched-chain alkylene residue with 2 to 18 carbon atoms, z denotes an integer of at least 1 and at most 2, and n denotes an integer from 2 to 6.

5. An adduct, containing epoxide groups, from (1) a polyepoxide compound which possesses at least one five membered or six membered carbo-cyclic or heterocyclic ring as well as on an average more than one glycidyl group bonded to a hetero-atom per molecule, and (2) 0.1 to 0.3 carboxyl group equivalents per 1 epoxide group equivalent of the polyepoxide (1), of an acid polyester of formula

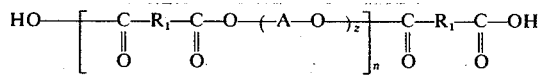

wherein $R_1$ denotes the hydrocarbon residue of a member selected from the group consisting of an unsaturated aliphatic-cycloaliphatic higher dicarboxylic acid which has been manufactured by dimerization of unsaturated monomeric fatty acid having 16 to 18 carbon atoms in the molecule, and a saturated aliphatic-cycloaliphatic higher dicarboxylic acid which has been manufactured by dimerization of unsaturated monomeric fatty acid having 16 to 18 carbon atoms in the molecule and subsequent hydrogenation of such a dimeric fatty acid, A denotes a straight-chain or branched-chain alkylene residue with 2 to 18 carbon atoms, z denotes an integer of at least 1 and at most 2, and n denotes an integer from 2 to 6.

6. An adduct as claimed in claim 1 wherein the polyepoxide (1) is the polyglycidyl ether of a polyhydric cycloaliphatic alcohol.

7. An adduct as claimed in claim 6 wherein the polyepoxide (1) is the diglycidyl ether of 2,2-bis(4'-hydroxycyclohexyl)propane.

8. An adduct as claimed in claim 1 wherein the polyepoxide (1) is a polyglycidyl ether of a polyhydric phenol.

9. An adduct as claimed in claim 8 wherein the polyepoxide (1) is a polyglycidyl ether of 2,2-bis(p-hydroxyphenyl)propane.

10. An adduct as claimed in claim 1 wherein the polyepoxide (1) is a polyglycidyl ester of a cycloaliphatic polycarboxylic acid.

11. An adduct as claimed in claim 10 wherein the polyepoxide (1) is the diglycidyl ester of $\Delta^4$-tetrahydrophthalic acid or of hexahydrophthalic acid.

12. An adduct as claimed in claim 11 wherein the polyepoxide compound (1) is the di-($\beta$-methylglycidyl)ester of $\Delta^4$-tetrahydrophthalic acid.

13. An adduct as claimed in claim 1, wherein the acid polyester (2) is obtained by reaction of dimerized fatty acid with diol of formula HO-A-OH.

14. An adduct as claimed in claim 13, wherein the acid polyester (2) is derived from dimerized oleic acid, as the dimeric fatty acid.

15. An adduct as claimed in claim 13, wherein the acid polyester (2) is derived from dimerized castor oil fatty acid as the dimeric fatty acid.

16. An adduct as claimed in claim 13, wherein the acid polyester (2) is derived from ethylene glycol as the diol.

17. An adduct as claimed in claim 13, wherein the acid polyester (2) is derived from butanediol-(1,4) as the diol.

18. An adduct as claimed in claim 13, wherein the acid polyester (2) is derived from hexanediol-(1,6) as the diol.

19. A heat-curable composition of matter, comprising (a) an adduct containing epoxide groups as claimed in claim 1, and (b) a carbocyclic polycarboxylic acid anhydride or a carbocyclic polyamine as the curing agent.

* * * * *